United States Patent Office 3,423,344
Patented Jan. 21, 1969

3,423,344
POLYURETHANE POLYOL MIXTURE CONTAINING HYDROXYALKYLATED POLYAMINES
Alec Odinak, New Haven, Harold E. Reymore, Jr., Wallingford, and Adnan A. R. Sayigh, North Haven, Conn., assignors to The Upjohn Company, Kalamazoo, Mich., a corporation of Delaware
No Drawing. Continuation-in-part of applications Ser. No. 334,600, Dec. 30, 1963, and Ser. No. 558,561, June 20, 1966. This application Aug. 15, 1967, Ser. No. 660,614
U.S. Cl. 260—2.5          18 Claims
Int. Cl. C07c 91/40; C08g 22/44, 22/14

ABSTRACT OF THE DISCLOSURE

Polyols, useful in the preparation of polyurethane foams of high structural strength, are mixtures of (a) the product obtained by reacting from 2 to 5 moles of alkylene oxide (propylene oxide preferred) with 1 amine equivalent of a mixture of polyamines obtained by acid condensation of aniline and formaldehyde and (b) a supplementary polyol of equivalent weight 30 to 200 and functionality from 2 to 6, inclusive. Component (a) represents from 20 to 90 percent by weight of the mixture.

CROSS REFERENCE TO RELATED APPLICATIONS

This application is a continuation-in-part of application Ser. No. 334,600, filed Dec. 30, 1963 and of application Ser. No. 558,561, filed June 20, 1966 both abandoned.

BACKGROUND OF THE INVENTION

Field of the invention

This invention relates to novel polyol compositions and to novel polyurethanes produced therefrom and is more particularly concerned with novel blends of adducts of alkylene oxides and polyamines with low equivalent weight polyols, and with novel polyurethane foams produced from said polyol blends.

Description of the prior art

The preparation of polyols by reaction of alkylene oxides with various amines, including polyamines derived by acid condensation of aniline and formaldehyde, has been described previously. Illustratively, British specification 910,333 describes the alkoxylation of di(aminophenyl)methane and of tri(aminophenyl)methane by reaction with either ethylene oxide or propylene oxide in the presence of a catalyst such as potassium hydroxide.

Lanham, U.S. Patent 3,159,591, describes in broad terms the preparation of polyethers by reacting 1,2-alkylene oxides with a wide variety of polyamines including those obtained by interaction of aromatic monoamines with formaldehyde and other aldehydes. The only polyamine of the latter group specifically shown by the reference is a trimer i.e. [3-(4-aminobenzyl)-4-aminophenyl][4-aminophenyl]methane.

French Patent of Addition No. 79,511 (third Certificate of Addition to French Patent 1,233,862) discloses the preparation of polyethers by reacting alkylene oxides with various aromatic amines including toluenediamines and with polyamines obtained by acid condensation of aniline with formaldehyde. The only specific examples of the latter polyamines shown are those said to contain "about 15% of polyamines (mainly triamines)" the remaining 85% being di(aminophenyl)methane. Example 1 of said reference shows the reaction of the latter polyamine with 8.4 moles of ethylene oxide per amine equivalent of polyamine. Example 14 shows similar products obtained from the same polyamine and 5.72 moles of propylene oxide per amine equivalent of polyamine. Said reference also discloses, in broad terms, the admixture of said alkoxylated polyamines with other polyols commonly used in the polyurethane foam producing art.

It has not previously been recognized, however, that by using starting polyamines, derived from acid condensation of aniline and formaldehyde, having certain critical overall composition and by employing critical proportions of alkylene oxide to polyamine in the alkoxylation thereof, and by mixing the alkoxylated polyamine with a second polyol falling within a particular class of polyols, it is possible to produce polyols which possess unexpectedly superior properties.

We have now found that, within the broad generality of alkoxylated polyamine polyols hitherto known, there is a small group thereof which, in combination with one or more of an equally specific class of low equivalent weight polyols, possess outstanding properties particularly when used as the polyol component in making cellular polyurethanes.

SUMMARY OF THE INVENTION

The present invention comprises a novel polyol comprising a mixture of:
 (a) an hydroxyalkylated polyamine produced by mixing under hydroxyalkylation conditions,
   (i) from 2 to 5 molecular equivalents of a member selected from the group consisting of ethylene oxide, propylene oxide, 1,2-butylene oxide, and mixtures thereof, and
   (ii) one amine equivalent of a polyamine mixture, 100 parts of said polyamine mixture containing 45 to 70 parts of methylenedianilines, the remaining parts being triamines and polyamines of higher molecular weight, said polyamine mixture having been formed by acid condensation of aniline and formaldehyde; and
 (b) a supplementary polyol having a functionality in the range of 2 to 6, inclusive, and an equivalent weight in the range of 30 to 200.

Preferably the components (a) and (b) and the proportions in which they are admixed are so chosen that the overall hydroxyl number of the mixture is within the range of 280 to 650.

The novel polyols of the invention are superior to those hitherto available by reason, inter alia, of their ease of handling, ready compatibility with the other conventional components of a polyurethane foam forming system and the increased structural strength and integrity which their use confers upon polyurethane foams produced therefrom, as evidenced by high compressive strength, high strength/density ratio, and resistance to volume change under humid and dry aging conditions.

The present invention also comprises polyurethane foams made in accordance with procedures known in the art but employing the novel polyols of the invention as a part or the whole of the polyol component.

DETAILED DESCRIPTION OF THE INVENTION

The hydroxyalkylated polyamine component of the novel polyols of the invention is an adduct prepared from a methylene bridged polyphenyl polyamine and an alkylene oxide selected from the group consisting of ethylene oxide, propylene oxide, 1,2-butylene oxide, and mixtures thereof.

The polyamines used in producing those adducts are mixtures of methylene-bridged polyphenyl polyamines containing about 45 to about 70 parts by weight of isomeric methylene dianilines, the remainder being triamines and polyamines of higher molecular weight.

The mixtures of methylene-bridged polyphenyl polyamines are known in the art or can be prepared by methods known in the art, for example, by mixing aqueous formaldehyde solutions with mixtures of aniline and hydrochloric acid [e.g., Wagner, J. Am. Chem. Soc. 56, 1944–6 (1934); U.S. Patent 2,950,263; German Specification 1,131,877] or by mixing aniline with mixtures of hydrochloric acid and aqueous formaldehyde solution [e.g., U.S. Patent 2,683,730]. According to the prior art, the composition of a particular polyamine mixture depends upon the relative amounts of aniline and formaldehyde used to produce it. Thus, it has been reported that polyamine mixtures containing 40 to 85% methylenedianilines are produced by reacting aniline and formaldehyde in the molecular ratios 4:2.5 and 4:1, respectively [U.S. Patents 2,683,730 and 2,950,263].

As will be apparent to those skilled in the art, the type and amounts of triamines and polyamines of higher molecular weight in a particular mixture of diamines, triamines, and polyamines will vary according to the proportions of aniline and formaldehyde used to produce that mixture. Methylenedianilines can be removed from a polyamine mixture, for example, by fractional distillation at reduced pressure. The distillation residue from a polyamine mixture prepared by reacting aniline and formaldehyde in molecular ratio 4:2.5 will differ not only in amount but also in composition from the distillation residue from a polyamine mixture obtained by reacting aniline and formaldehyde in molecular ratio 4:1. A wide variety of polyamine blends can thus be produced by mixing various amounts of methylenedianiline mixtures with various amounts of a variety of polyamine distillation residues. Therefore, it is not necessary that the polyamine-alkylene oxide polyol adducts be limited in composition to those obtained by hydroxyalkylation of polyamine mixtures produced by direct interaction of aniline and formaldehyde.

The above-described methylene-bridged polyphenyl polyamine mixtures are hydroxyalkylated by reaction with the appropriate amount of an alkylene oxide, for example, ethylene oxide, propylene oxide, 1,2-butylene oxide, and the like, or with a mixture of 2 or more alkylene oxides. When it is desired that two or more alkylene oxides be used to produce a particular polyamine-alkylene oxide polyol adduct, the alkylene oxides can be reacted with the polyamine mixture in admixture so that the oxyalkylene moieties are attached to the amino nitrogens in a random arrangement. Alternatively, the alkylene oxides can be reacted with the polyamine mixture sequentially in any order so that the oxyalkylene moieties are attached to the amino nitrogens in a block arrangement.

Polyamine-alkylene oxide polyol adducts useful in the practice of this invention are produced by reacting about 2 to about 5 molecular equivalents of the alkylene oxide or oxide mixture with each amine equivalent of polyamine mixture. By the term, amine equivalent, is meant as many weight units as there are units in the equivalent weight of the polyamine mixture. The equivalent weight is determined by measuring the amount of polyamine required to neutralize one molecular equivalent of an acid, for example, 36.5 grams of hydrochloric acid. If 105 grams of polyamine mixture is required to neutralize 36.5 grams of hydrochloric acid, the equivalent weight of the polyamine mixture is 105. An amine equivalent of the polyamine mixture would then be 105 grams or 105 pounds or 105 kilograms depending on the weight units chosen. A molecular equivalent of an alkylene oxide would be as many of the same weight units, i.e., grams, pounds, or kilograms, as there are units in the molecular weight of the alkylene oxide.

The reaction between alkylene oxide and polyamine mixture is carried out in the range about 125° to about 250° C. at atmospheric pressure, i.e., in an open reaction vessel, or at superatmospheric pressure, i.e., in an autoclave or similar closed vessel. At atmospheric pressure, it is usually preferred to heat the reaction mixture with stirring in the range about 150° to about 210° and to pass oxide below the surface of the reaction mixture at about the rate at which oxide is consumed. At superatmospheric pressure, the entire charge of alkylene oxide can be added to the polyamine with cooling, the reaction vessel then being sealed and raised to the desired reaction temperature range. When apparatus design permits, alternatively, the charge of polyamine mixture can be sealed in the apparatus and heated with agitation, the alkylene oxide then being added until the desired reaction pressure is attained. Additional oxide is subsequently added as required until the desired reaction is complete. A reaction pressure in the range about 20 to about 60 p.s.i.g. is preferred, although in many instances, for example, when the entire charge of alkylene oxide is placed in the pressure vessel at the start, a substantially higher pressure is feasible (see, Table III, below).

The usual precautions should, of course, be observed when working with alkylene oxides at elevated pressures and temperatures, for example, as set forth in Houben-Weyl, "Die Methoden der Organischen Chemie," 4th ed., vol. 14, pt. 2, pp. 425–453 (1963). For example, it is desirable when working at elevated pressure to exclude oxygen from the closed reaction vessel by flushing with an inert gas, for example, nitrogen or argon.

It was observed that 2 molecular equivalents of alkylene oxide per amine equivalent of polyamine will transform each amino moiety to a tertiary amino moiety, both free amino hydrogen atoms of each primary amino moiety being removed and replaced by hydroxyalkyl moieties corresponding to the specific alkylene oxide used. In other words, the second equivalent of alkylene oxide tends to attack the remaining N-H linkage rather than the O-H linkage formed during reaction of the first equivalent of alkylene oxide. In the case of unsymmetrical alkylene oxides, for example, propylene oxide and 1,2-butylene oxide, the hydroxyalkyl moieties which are attached to amino nitrogen can be primary or secondary with regard to the O-H linkage. The predominate isomer is usually the secondary hydroxy configuration, although the product usually contains at least a minor amount, e.g., about 10%, of the primary hydroxy configuration.

Although hydroxyalkylation of an amino moiety with 2 equivalents of alkylene oxide proceeds satisfactorily in the absence of a catalyst, it is preferred to use a catalyst for hydroxyalkylation with larger proportions of alkylene oxide. It is thought that the latter situation involves interaction of alkylene oxide with hydroxy moieties as well as with amino moieties. Suitable catalysts are alkali metals, e.g., sodium and potassium, and alkali metal hydroxides, e.g., sodium hydroxide and potassium hydroxide. Other catalysts known in the art to be useful for hydroxyalkylation of active hydrogen compounds can also be used. Although the catalyst can be present at the start of the hydroxyalkylation reaction, it is preferred to react the polyamine mixture with 2 molecular equivalents of the alkylene oxide in the absence of a catalyst and then, if further hydroxyalkylation is desired, to add the appropriate amount of catalyst, with cooling and pressure release if necessary, before adding additional alkylene oxide. It is preferred to use about 0.0001 to about one part by weight of catalyst per 100 parts by weight of polyamine mixture.

Although a reaction diluent is usually not necessary, an inert liquid diluent can be present in the reaction mixture to aid in the dispersion of the alkylene oxide into the polyamine mixture. Examples of suitable diluents are monochlorobenzene, N,N-dimethylformamide, and xylene.

There is usually no need to purify a polyamine-alkylene oxide polyol adduct prepared as described above before using it to produce the novel polyol mixtures of this invention. In some instances, however, it is advantageous to pass a stream of an inert gas, for example, nitrogen or argon, through the reaction mass, or to subject the entire mass to reduced pressure to remove traces of unreacted alkylene oxide. It is also usually advantageous to remove any reaction solvent in the same manner.

The polyamine-alkylene oxide polyol adducts prepared as above described are pale brown to reddish-brown clear resinous materials ranging from mobile liquids through moderately viscous liquids to brittle solids with softening points ranging from about 30° C. to about 100° C. The greater number of equivalents of alkylene oxide reacted with each amine equivalent of polyamine, the lower will be the softening point or the viscosity of the polyol adduct. It was observed that polyamine-ethylene oxide and polyamine-1,2-butylene oxide polyol adducts are both less viscous than polyamine-propylene oxide polyol adducts produced from similar equivalents of alkylene oxide. It was also observed that the viscosity of a polyamine alkylene oxide polyol adduct decreases with an increase in the methylenedianiline content of the polyamine reactant.

The supplementary polyol component (b) of the novel polyols of the invention can be any polyol having a functionality in the range of 2 to 6, inclusive, and equivalent weight in the range of 30 to 90 (hydroxy number in the range of 623 to 1870).

In defining the necessary characteristics of the supplementary polyol fraction, the term hydroxyl number is defined as the number of milligrams of potassium hydroxide equivalent to the hydroxyl content of one gram of the supplementary polyol fraction, determined by acylation as described in standard texts on analytical methods. The corresponding equivalent weight stands in the following relationship to the hydroxyl number:

$$\text{Equivalent weight} = \frac{56{,}100}{\text{Hydroxyl number}}$$

The term functionality is defined by the formula:

$$\text{Functionality} = \frac{\text{Molecular weight} \times \text{Hydroxyl number}}{1000 \times 56.1}$$

where molecular weight is the average molecular weight of the polyol fraction.

The supplementary polyol fraction of the novel polyol mixtures of this invention can be homogeneous i.e. it can be composed of a single polyol having the required characteristics, or it can be a mixture of two or more polyols with closely related structures and/or molecular weights, or it can be a mixture of two or more polyols with rather diverse structures. Thus, the supplementary polyol fraction can contain any combination of diols, triols, tetrols, pentols, hexols and polyols of even higher functionality some of which, taken individually, do not possess the required equivalent weight and/or functionality, provided that the overall equivalent weight and functionality of the resulting combination fall within the limits set forth above. It is preferred, however, that no substantial number of the molecules in the supplementary polyol fraction have only one hydroxyl moiety per molecule.

Examples of polyols which can be employed alone, or in combination, as supplementary polyols having the characteristics set forth above in accordance with this invention are:

(i) aliphatic diols having a molecular weight from about 60 to about 400 such as ethylene glycol, 1,2-propylene glycol, 1,3-propanediol, 1,4-butanediol, 2,3-butanediol, 1,5-pentanediol, 1,2-hexanediol, diethanolamine, diisopropanolamine, 1,1-dimethylolethylamine, and the like, and the adducts thereof with one or more molar proportions of ethylene oxide, propylene oxide, or 1,2-butylene oxide;

(ii) aliphatic triols having a molecular weight from about 106 to about 600 such as trimethylolmethane, trimethylolethane, trimethylolpropane, 1,2,3-hexanetriol, 1,2,6-hexanetriol, 1,1,1-trimethylolhexane, triethanolamine, tripropanolamine, triisopropanolamine and the like, and adducts of the above named compounds, and of glycerol, with one or more molar proportions of ethylene oxide, propylene oxide or 1,2-butylene oxide;

(iii) aliphatic tetrols having a molecular weight from about 120 to about 800 such as erythritol, pentaerythritol, and the adduct thereof with one or more molar proportions of ethylene oxide, propylene oxide, or 1,2-butylene oxide;

(iv) aliphatic pentols having a molecular weight from about 150 to about 1000 such as arabitol, xylitol, and the like and adducts thereof with one or more molar proportions of ethylene oxide, propylene oxide, or 1,2-butylene oxide;

(v) aliphatic hexols having a molecular weight from about 180 to about 1200 such as mannitol, sorbitol, dipentaerythritol, and the like and adducts thereof with one or more molar proportions of ethylene oxide, propylene oxide or 1,2-butylene oxide; and (vi) aniline-alkylene oxide diol adducts having a molecular weight from about 60 to about 400 such as the adducts of aniline with ethylene oxide, propylene oxide, 1,2-butylene oxide, and the like.

While any of the above polyols, taken alone or in combination, can be used in making the novel polyol mixtures of the invention it is preferred to use an aliphatic triol. Particularly preferred triols are the adducts of glycerol and propylene oxide having an equivalent weight within the range of 30 to 90 and adducts of trimethylolpropane and ethylene oxide having an equivalent weight within the range of 45 to 90.

The production of the novel polyurethane foams of the invention from the novel polyol mixtures of the invention is carried out in accordance with procedures well-known in the art; see, for example, Saunders et al., Polyurethanes, Chemistry and Technology, Part I, Interscience Publishers, New York, 1962. The novel aspect in producing the novel polyurethane foams of this invention is concerned with the use of the particular novel polyol mixtures of the invention described above, and, in part, with the use of certain combinations of those polyols with particular polyisocyanates.

Thus the novel polyurethanes of the invention are produced by reaction of the novel polyol mixtures described above with any of the polyisocyanates conventionally employed in the art in the presence of catalysts, blowing agents, surfactants, cell-openers and the like adjuvants commonly employed for the production of polyurethane foams. If desired, a phosphorus containing polyol can be incorporated in the reaction mixture (either as a separate component or by prior admixture with the polyol component) in order to impart fire retardant properties to the resulting foam. Examples of such phosphorus containing polyols are the tris polypropylene glycol phosphates produced by interaction of phosphoric acid and propylene oxide (for example, as described in U.S. Patents 2,372,244 and 3,094,549) or by interaction of triphenyl phosphate and polypropylene glycol in the presence of a catalyst (for example, as described in U.S.

Patent 3,061,625) and the O,O-dialkyl N,N-bis(hydroxyalkyl)aminomethanephosphonates such as those described in U.S. Patents 3,076,010 and 3,235,517. Generally speaking such phosphorus containing polyols are employed in an amount such that the resulting foam contains at least about 1% by weight of phosphorus in order that said foam shall be rated as at least "self-extinguishing" when tested in accordance with the procedure described in ASTM D 1692–59T.

We have found that, when phosphorus containing polyols, such as those described above, are employed in combination with polyol mixtures of the invention wherein the supplementary polyol contains exclusively primary hydroxyl groups, the fire retardant properties of the resulting foams are surprisingly and unexpectedly enhanced. Two important results flow from this finding. Thus, the use of phosphorus containing polyols with polyol mixtures of the invention in which the supplementary polyol contains exclusively primary hydroxy groups gives rise to polyurethane foams having a significantly greater degree of fire retardance than foams produced using equivalent amounts of known polyols in place of the above polyol mixtures of the invention. Alternatively the amount of phosphorus containing polyol required to impart a given degree of fire retardance to a polyurethane foam can be markedly reduced if the phosphorus containing polyol is used in combination with a polyol mixture of the invention wherein the supplementary polyol contains exclusively primary hydroxy groups. The ability to reduce the amount of phosphorus containing polyol required for flame retardance is important from the point of view of economics in that the phosphorus containing polyols are generally more expensive than the other polyol components of a foam reaction mix and the resulting cost of the polyurethane foam can be reduced by eliminating a part or all of the phosphorus containing polyol.

Accordingly, in a further aspect of the present invention there is provided a particularly advantageous method of preparing polyurethane foams having fire retardant properties which process comprises employing, in combination, a phosphorus containing polyol and a polyol mixture of the invention wherein the supplementary polyol contains exclusively primary hydroxyl groups. Advantageously the amount of phosphorus containing polyol employed in such combination is sufficient to provide at least about 0.5% by weight of phosphorus in the resulting foam. A particularly preferred polyol mixture of the invention for use in the preparation of such fire retardant foams is one which comprises a mixture of a polyamine-alkylene oxide adduct as hereinbefore defined and an adduct of trimethylolpropane and ethylene oxide prepared using approximately 1 equivalent of ethylene oxide per equivalent of trimethylolpropane.

Any of the prior art polyisocyanates can be used as reactants in preparing the novel polyurethane foams of this invention, e.g., 2,4-tolylene diisocyanate, 2,6-tolylene diisocyanate, 4,4′-diphenylmethane diisocyanate, dianisidine diisocyanate, tolidine diisocyanate, hexamethylenediisocyanate, m-xylylene diisocyanate, 1,5-naphthalene diisocyanate, and other di- and higher polyisocyanates such as those listed in the tables of Siefken, Ann. 562, 122–135 (1949). Preferred polyisocyanates, however, are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Patents No. 2,683,730; 2,950,263; and 3,012,008; Canadian Patent No. 665,495; and German specification 1,131,877. Particularly preferred polyisocyanates of this type are prepared by phosgenation of methylene-bridged polyphenyl polyamine mixtures containing about 35 to about 90 parts by weight of methylenedianilines, the remainder being triamines and polyamines of higher molecular weight. Of this latter type, especially preferred are polyisocyanates prepared by phosgenation of polyamine mixtures containing about 45 to about 60 parts by weight of methylenedianilines. For reasons not completely understood, the particular combination of polyisocyanates produced by phosgenation of mixtures of methylene-bridged polyphenyl polyamines and polyols produced by hydroxyalkylation of the same type of polyamines results in polyurethane foams of particularly and unexpectedly superior properties compared with foams produced from other polyisocyanates. Moreover, use of methylene-bridged polyphenyl polyamine mixtures to produce both the polyisocyanate reactants and the polyol reactants offers an unusual economic advantage especially for large scale production.

The several aspects of this invention can be more fully understood from the following examples.

(I) Production of methylene-bridged polyphenyl polyamine mixtures

Following the procedure of either Seeger et al., U.S. Patent 2,683,730 or Abbotson et al., U.S. Patent 2,950,263, mixtures of 37 percent aqueous formaldehyde, 20° Bé. hydrochloric acid and aniline were interacted. In some instances, the relatively small amounts of residual aniline were removed from the polyamine mixtures by distillation at reduced pressure. In other instances, the aniline was allowed to remain in the polyamine mixtures. Exemplary proportions of aniline, formaldehyde, and HCl, and the methylenedianiline (MDA) content of the resulting products on an aniline-free basis are given in Table I.

TABLE I.—PRODUCTION OF POLYAMINE MIXTURES

| Molecular Proportions | | | MDA Content, percent |
| Aniline | Formaldehyde | HCl | |
| --- | --- | --- | --- |
| 4.0 | 2.0 | 2.0 | 68 |
| 4.0 | 2.26 | 2.2 | 50 |
| 4.0 | 2.3 | 1.35 | 45 |

(II) Hydroxyalkylation of polyamine mixtures

In each of the examples of this section, the methylene-bridged polyphenyl polyamine reactants were prepared as described in section (I) above.

(A) Hydroxyalkylation at atmospheric pressure

EXAMPLE 1

The equipment was a glass flask equipped with an agitator, thermometer, inlet tube, and water-cooled reflux condenser connected at its open end to a receiver cooled with solid carbon dioxide. A polyamine mixture of equivalent weight 105, containing 48.4 percent methylenedianilines, the remainder being triamines and polyamines of higher molecular weight (420 g.; 4.0 equivalents), was placed in the flask. About 0.4 g. of sodium hydroxide was added and air was swept from the flask with a stream of dry nitrogen gas. A slight positive pressure of nitrogen was thereafter maintained in the flask until the reaction was complete. The polyamine mixture was stirred and heated to about 170° C. Propylene oxide (446.6 g.; 7.7 moles) was then added below the surface of the reaction mixture with continued agitation during about 4.5 hours. The reaction mixture was maintained in the range 170° to 190° C. The small amount of propylene oxide which accumulated in the cold receiver was returned to the reaction flask. The resulting reaction mixture was then allowed to cool to about 100° C. and was poured out of the flask. The hydroxyl number of the polyamine propylene oxide polyol product was 521.

Table II described 14 additional examples of the production of polyamine-alkylene oxide adducts by the procedure of Example 1. Examples 2, 3, 7, 10, 12, 13, and 14 of this table disclose the preparation of polyols which do not fall within the scope of the invention but which are included herein for comparative purposes.

TABLE II.—HYDROXYALKYLATION OF AMINE MIXTURES AT ATMOSPHERIC PRESSURE

| Example | Amine Reactant | | Equivalents Propylene Oxide [3] | Catalysts [4] | Reaction Temperature Range in °C. | Reaction Time in Hours | Product Hydroxyl Number | Product Viscosity, cps. at 50° C. |
|---|---|---|---|---|---|---|---|---|
| | MDA Content [1] | Aniline Content [2] | | | | | | |
| 2 | 39.6 | 0 | 2.0 | None | 200–210 | 14.0 | 520 | |
| 3 | 39.6 | 0 | 4.0 | Sodium [5] | 200–215 | 47 | 411 | [6] 9,600 |
| 4 | 48.4 | 0 | 1.95 | None | 170–190 | 5.0 | 521 | |
| 5 | 48.4 | 0 | 1.9 | Sodium | 170–190 | 3.0 | 516 | |
| 6 | 48.4 | 0 | 2.45 | ---do--- | 170–190 | 5.0 | 503 | |
| 7 | 84.0 | 0 | 3.0 | KOH | 200–205 | 12.0 | 411 | 63,000 |
| 8 | 48.4 | 0 | 5.0 | KOH | 185–209 | 21.5 | 307 | 7,360 |
| 9 | 48.4 | 20 | 3.5 | KOH | 200–210 | 18.0 | 358 | 10,800 |
| 10 | 83.6 | 47 | 2.05 | None | 170–190 | 3.5 | 526 | 31,650 |
| 11 | 48.4 | 50 | 3.5 | KOH | 184–205 | 20.0 | 386 | [7] 2,750 |
| 12 | 89.3 | 61 | 2.0 | None | 170–190 | 5.5 | 525 | 12,500 |
| 13 | 89.3 | 61 | [8] 1.8 | ---do--- | 170–190 | 5.0 | 521 | 9,000 |
| 14 | 89.3 | 61 | [9] 1.7 | ---do--- | 170–190 | 6.0 | 488 | 7,000 |
| 15 | 48.4 | 80 | 3.5 | ---do--- | 200–210 | 14.0 | 520 | |

[1] Weight percent of methylenedianilines in polyamine mixture on aniline-free basis.
[2] Weight percent of aniline in entire amine reactant.
[3] Molecular equivalents per amine equivalent including aniline when present.
[4] About 0.1 weight percent based on weight of amine reactant.
[5] An additional 0.1 percent of sodium was added after 30 hours of reaction time.
[6] At 46° C.
[7] At 47° C.
[8] 0.2 equivalents of 1,2-butylene oxide was also present in admixture with each .8 equivalents of propylene oxide.
[9] 0.3 equivalents of 1,2-butylene oxide was also present in admixture with each 1.7 equivalents of propylene oxide.

EXAMPLE 16

Following the procedure of Example 1, a polyamine mixture of equivalent weight 103, containing 50 percent methylenedianilines, the remainder being triamines and polyamines of higher molecular weight (412 g.; 4.0 equivalents), was reacted in the absence of catalyst with propylene oxide (465 g.; 8 moles) during about 10 hours in the range 218° to 228° C. The reaction mixture was cooled overnight, still under a slight positive pressure of nitrogen gas. Potassium hydroxide (0.52 g.) was then added and the reaction mixture was reacted further with propylene oxide (348.5; 6 moles) during about 10 hours in the range 190° to 240° C. The resulting polyamine-propylene oxide adduct had a hydroxyl number 388; viscosity 59,300 cps. at 50° C.

EXAMPLE 17

Following the procedure of Example 16, a polyamine mixture of equivalent weight 103, containing 50 percent methylenedianilines, the remainder being triamines and polyamines of higher molecular weight (412 g.; 4.0 equivalents), was reacted in the absence of catalyst with ethylene oxide (367.4 g.; 8.35 moles) during about 3 hours in the range 165° to 205° C. Potassium hydroxide (0.52 g.) was then added and the mixture was reacted with additional ethylene oxide (340.3 g.; 7.75 mole) during about 3 hours in the range 170° to 200° C. The resulting polyamine-ethylene oxide polyol adduct had a hydroxyl number 414; viscosity 11,100 cps. at 50° C.

EXAMPLE 18

Following the procedure of Example 16, a polyamine mixture of equivalent weight 103, containing 50 percent methylenedianilines, the remainder being triamines and polyamines of higher molecular weight (412 g.; 4.0 equivalents), was reacted in the absence of catalysts with ethylene oxide (352.8 g.; 8 moles) during about 3.5 hours in the range 170° to 200° C. Potassium hydroxide (0.52 g.) was then added and the mixture was reacted with propylene oxide (458.2 g.; 7.9 moles) during about 9 hours in the range 200° to 240° C. The resulting polyamine-ethylene oxide-propylene oxide polyol adduct had a hydroxyl number 400; viscosity 10,750 cps. at 50° C.

EXAMPLE 19

Following the procedure of Example 18 but reversing the order of alkylene oxide addition, a polyamine mixture of equivalent weight 103, containing 50 percent methylenedianilines, the remainder being triamines and polyamines of higher molecular weight (412 g.; 4.0 equivalents), was reacted in the absence of catalyst with propylene oxide (456 g.; 7.85 mole) during 10 hours in the range 200° to 230° C. Potassium hydroxide (0.52 g.) was then added and the mixture was heated in the presence of ethylene oxide in the range 170° to 200° C. for 45 minutes. Because the absorption of ethylene oxide was slow at first, additional potassium hydroxide (0.52 g.) was added and the temperature was raised to the range 200° to 225° C. after which the ethylene oxide (356 g.; 8.1 mole) was absorbed during about 4 hours. The resulting polyamine-propylene oxide-ethylene oxide polyol adduct had a hydroxyl number 358; viscosity 20,400 cps. at 50° C.

EXAMPLE 20

Following the procedure of Example 16, 406.4 g. of an amine mixture, equivalent weight 101.6, containing 20 percent by weight of aniline and 80 percent by weight of a polyamine mixture containing 50 percent methylenedianilines, the remainder of the polyamine mixture being triamines and polyamines of higher molecular weight, was reacted with ethylene oxide (356.9 g.; 8.1 mole) during 8 hours in the range 130° to 190°. Potassium hydroxide (0.52 g.) was then added and the mixture was reacted with propylene oxide (484.2 g.; 8.3 moles) during 5.5 hours in the range 190° to 230° C. The resulting aniline-polyamine-ethylene oxide-propylene oxide polyol adduct had a hydroxyl number 260; viscosity 4,100 cps. at 50° C.

(B) Hydroxyalkylation at superatmospheric pressure

EXAMPLE 21

The equipment used was an electrically heated, rocking autoclave with a 2.5-liter stainless steel liner. A polyamine mixture of equivalent weight 105, containing 48.4 percent methylenedianilines, the remainder being triamines and polyamines of higher molecular weight (420 g.; 4.0 equivalents), was placed in the liner. Propylene oxide (510.4 g.; 8.8 moles; 2.2 equivalents per amine equivalent of polyamine mixture) was cooled to about 5° C. and added to the polyamine mixture. The autoclave was assembled and sealed, and was then rocked and heated until the temperature of the reaction mixture was about 135° C. At this point, an exothermic reaction started. The autoclave heater was turned off. A maximum temperature 202° C. and a maximum pressure 215 p.s.i.g. was obtained in about 10 minutes. Rocking was continued for about 30 minutes while the pressure and temperature gradually decreased. After cooling and opening the autoclave, the resinous product was softened by warming to about 100° and was then poured out of the liner. The hydroxyl number of the product was 506.

Table III describes 13 additional examples of the production of polyamine-alkylene oxide polyol adducts carried out by the procedure of Example 21. The polyol products usually contained traces of unreacted alkylene oxide which can be removed by warming at reduced pressure or by passing a stream of an inert gas, for example, nitrogen or argon, through the warm product. This stripping procedure is usually unnecessary when the polyols are to be used for the production of polyurethane foams but would be desirable when the polyols are used for the production of non-cellular polyurethanes. No catalyst was used in Examples 21–34.

Table III also gives data for the hydroxyalkylation of aniline (Examples 32, 33 and 34) and of a mixture of methylenedianilines free of aniline, triamines, and higher polyamines (Examples 30 and 31), by the procedure of Example 21. Examples 28 through 31, inclusive disclose the preparation of polyols which do not fall within the scope of the invention but which are included for purposes of comparison.

mixture of aniline (1,040 g.) and a polyamine mixture containing 50 percent methylenedianilines, the remainder being triamines and polyamines of higher molecular weight (4,160 g.) was placed in the autoclave which was then closed and flushed with nitrogen. The amine mixture was heated to about 160° C., and propylene oxide (5,900 g.) was gradually pumped into the autoclave below the surface of amine mixture during about 2.5 hours in the range 165° to 175° C. After an initial rise to about 55 p.s.i.g., the pressure dropped and remained at about 25 p.s.i.g., during addition of propylene oxide. The resulting reaction mixture was then cooled to about 90° C. and the residual propylene oxides (about 5 p.s.i.g.) vented. The autoclave was flushed with nitrogen, and about 500 g. of the product TABLE III.—HYDROXYALKYLATION OF AMINE MIXTURES AT SUPERATMOSPHERIC PRESSURE—ROCKED AUTOCLAVE

| Example | Amine Reactant | | Equivalents Alkylene Oxides [3] | | Maximum Temperature in °C. | Maximum Pressure in p.s.i.g. | Product Hydroxyl Number | Product Viscosity in cps. |
|---|---|---|---|---|---|---|---|---|
| | MDA Content [1] | Aniline Content [2] | Propylene Oxide | 1,2-butylene Oxide | | | | |
| 22 | 48.4 | 0 | 2.2 | | 180 | 195 | 505 | |
| 23 | 48.4 | 0 | | 2.2 | 195 | 190 | 436 | [5] 41,700 |
| 24 | 48.4 | 5.5 | 2.3 | | 204 | 195 | 518 | |
| 25 | 48.4 | 5.5 | 2.2 | | 240 | 188 | 476 | |
| 26 | 72.0 | 5.3 | 2.2 | | 161 | 135 | 499 | [6] 47,000 |
| 27 | 72.0 | 17.4 | 2.2 | | 157 | 135 | 489 | [6] 26,000 |
| 28 | 83.6 | 47 | 1.86 | [4] 0.25 | 211 | 235 | 486 | [7] 24,500 |
| 29 | 83.6 | 47 | 1.53 | [4] 0.54 | 207 | 255 | 508 | |
| 30 | 100 | 0 | 2.2 | | 207 | 250 | 503 | |
| 31 | 100 | 0 | | 2.2 | 201 | 167 | 424 | [5] 5,800 |
| 32 | 0 | 100 | 2.2 | | 241 | 345 | 533 | [8] 55,000 |
| 33 | 0 | 100 | 2.2 | | 286 | 455 | 525 | |
| 34 | 0 | 100 | | 2.06 | 243 | 187 | 441 | [8] 6,870 |

[1] Weight percent of methylenedianilines in polyamine mixture on aniline-free basis.
[2] Weight percent of aniline in entire amine reactant.
[3] Molecular equivalents per amine equivalent including aniline when present.
[4] The 1,2-butylene oxide was in admixture with the propylene oxide.
[5] At 73° C.
[6] At 85° C.
[7] At 52° C.
[8] At 25° C.

EXAMPLE 35

Following the procedure of Example 21, part of the hydroxypropylation product obtained in Example 22 (444 g.; 4.0 amine equivalents) was further reacted with propylene oxide (348 g.; 6.0 moles) in the presence of about 0.4 g. of potassium hydroxide, with a maximum autoclave temperature 231° C. and a maximum autoclave pressure 262 p.s.i.g. to give a polyamine-propylene oxide polyol adduct; hydroxyl number 286.

EXAMPLE 36

Following the procedure of Example 21, part of the hydroxypropylation product obtained in Example 22 (444 g.; 4.0 amine equivalents) was further reacted with propylene oxide (232 g.; 4.0 moles) in the presence of about 0.4 g. of potassium hydroxide with a maximum autoclave temperature 175° C. and a maximum autoclave pressure 195 p.s.i.g. to give a polyamine-propylene oxide polyol adduct; hydroxyl number 329.

EXAMPLE 37

The equipment used was an electrically heated 5-gallon autoclave with agitator, internal baffles, and inlet tube. A was removed and mixed with 25 g. of 50 percent aqueous potassium hydroxide solution. This mixture was heated with stirring at 120° C. and 2 mm. pressure for about 2 hours to remove the added water. The resulting mixture was returned to the rest of the intermediate product in the autoclave. Additional propylene oxide (4,490 g.) was then added as before during 2.25 hours in the range 165° to 175° C. The autoclave pressure was in the range 45 to 55 p.s.i.g. Stirring was continued for an additional 2 hours during which the pressure dropped to about 10 p.s.i.g. The product was cooled to 90° C., and the autoclave was vented, flushed with nitrogen, and emptied. The resulting, aniline-polyamine-propylene oxide adduct was blended with the adduct from a substantially identical run to give a product with a hydroxyl number 371 and a viscosity 17,000 at 50° C. Table IV describes 11 additional examples of the product of polyamine-alkylene oxide polyol adducts carried out by procedure of Example 37. It was occasionally necessary to cool a reaction mixture during hydroxyalkylation to keep the reaction temperature within the preferred range 165° to 175° C. Example 48 of Table IV does not fall within the scope of the invention but is included for purposes of comparison.

TABLE IV.—HYDROXYALKYLATION OF AMINE MIXTURES AT SUPERATMOSPHERIC PRESSURE—STIRRED AUTOCLAVE

| Example | Amine Reactant | | Equivalents Propylene Oxide [3] | Catalyst [4] | Propylene Oxide Addition | | | | Product Hydroxyl Number | Product Viscosity, cps. at 50° C. |
|---|---|---|---|---|---|---|---|---|---|---|
| | MDA Content [1] | Aniline Content [2] | | | Before Catalyst | | After Catalyst | | | |
| | | | | | Grams | Time | Grams | Time | | |
| 38 | 50 | 0 | 4.5 | KOH | 4,440 | 1.0 | 5,860 | 7.0 | 312 | 5,400 |
| 39 | 50 | 0 | 3.0 | KOH | 5,800 | 2.25 | 2,900 | 3.0 | 406 | 30,000 |
| 40 | 50 | 0 | [5] 2.0 | KOH | 5,800 | 1.75 | 3,600 | 3.0 | 379 | 21,000 |
| 41 | 50 | 0 | 2.0 | None | 4,410 | 2.5 | | | 507 | |
| 42 | 50 | 0 | 2.5 | KOH | 5,070 | 2.0 | 979 | 0.5 | 457 | |
| 43 | 50 | 20 | 3.5 | KOH | 5,927 | 1.5 | 4,468 | 3.25 | 355 | 11,500 |
| 44 | 50 | 20 | 3.5 | KOH | 5,900 | 2.25 | 4,490 | 3.0 | [6] 364 | [7] 17,000 |
| 45 | 50 | 50 | 3.0 | KOH | 6,150 | 2.25 | 2,810 | 2.0 | 421 | 2,600 |
| 46 | 50 | 50 | 2.0 | None | 5,940 | 3.0 | | | | |
| 47 | 50 | 80 | 2.0 | do | 7,099 | 2.25 | | | 547 | 5,175 |
| 48 | 85 | 65 | 2.0 | do | 6,100 | 3.0 | | | 534 | 7,100 |

[1] Weight percent of methylenedianilines in polyamine mixture on aniline-free basis.
[2] Weight percent of aniline in entire amine reactant.
[3] Molecular equivalents per amine equivalent including aniline when present.
[4] 0.07 to 0.10 part per 100 parts of expected total product.
[5] 1.0 equivalent of 1,2-butylene oxide was also present in admixture with each 2.0 equivalents of propylene oxide.
[6,7] Hydroxyl number and viscosity are values for a blend of the product of this run and that of a substantially identical run.

The following Examples 49–52, inclusive, disclose the preparation of polyols which do not fall within the scope of the invention but which are included herein for purposes of comparison.

EXAMPLE 49

Following the procedure of Example 38 but adding 12,700 grams of propylene oxide rather than 5,860 grams after addition of the KOH catalyst, there was obtained a polyamine-propylene oxide polyol adduct with about 7.5 equivalents of propylene oxide per amine equivalent; hydroxyl number about 211.

EXAMPLE 50

Following the procedure of Example 38 but adding 18,400 grams of propylene oxide rather than 5,860 grams after addition of the KOH catalyst, there was obtained a polyamine-propylene oxide polyol adduct with about 10 equivalents of propylene oxide per amine equivalent; hydroxyl number about 168.

EXAMPLE 51

Following the procedure of Example 38 but adding 24,100 grams of propylene oxide rather than 5,860 grams, there was obtained a polyamine-propylene oxide polyol adduct with about 12.5 equivalents of propylene oxide per amine equivalent; hydroxyl number about 140.

EXAMPLE 52

Following the procedure of Example 38 but adding 29,800 grams of propylene oxide rather than 5,860 grams, there was obtained a polyamine-propylene oxide polyol adduct with about 15 equivalents of propylene oxide per amine equivalent; hydroxyl number about 117.

EXAMPLE 53

The equipment used was a heated 250-gallon pressure vessel with agitator. A polyamine mixture containing 50 percent methylenedianilines, the remainder being triamines and polyamines of higher molecular weight, was placed in the vessel which was then closed and heated to the range 150° to 160° C. Nitrogen gas was forced in through the polyamine to 50 p.s.i.g. This pressure was released to 5 p.s.i.g. Again nitrogen was introduced to 50 p.s.i.g. and vented to 5 p.s.i.g. Addition of propylene oxide was then started and continued at such a rate that pressure in the vessel did not exceed 50 p.s.i.g. The exothermic reaction was maintained in the range 150° to 160° C. with cooling. When about 2 equivalents of propylene oxide had been introduced, potassium hydroxide (about 0.1 percent based on total expected weight of adduct) was added in the form of a solution in a small amount of aniline-propylene oxide adduct. Propylene oxide addition was then resumed and continued until about 3.5 equivalents per amine equivalent had been added. Agitation was continued for an additional hour while the pressure in the vessel gradually decreased. The vessel was vented and unreacted propylene oxide was removed by sparging with nitrogen for about 30 minutes. The resulting polyamine-propylene oxide polyol adduct was then ready for use.

EXAMPLE 54

Following the procedure of Example 53, a polyamine mixture containing 50 percent methylenedianilines, the remainder being triamines and polyamines of higher molecular weight, was reacted with sufficient propylene oxide to provide 2 equivalents of propylene oxide per amine equivalent. A catalyst was not used. The polyamine-propylene oxide polyol adduct had a hydroxyl number 529.

EXAMPLE 55

Following the procedure of Example 53, aniline was reacted with sufficient propylene oxide to provide 3.5 equivalents of propylene oxide per amine equivalent. Potassium hydroxide catalyst as in Example 52 was added after about 2 equivalents of propyleneoxide had been introduced. The resulting aniline-propylene oxide adduct had a hydroxyl number 377; viscosity 242 cps. at 50° C.

EXAMPLE 56

A polyol mixture was prepared by intimately mixing (a) 20 parts by weight of a glycerol-propylene oxide polyol adduct (equiv. wt.=89) containing 1.01 equivalents of propylene oxide per 1.0 hydroxyl equivalent of glycerol and (b) 80 parts by weight of a polyamine-propylene oxide polyol adduct prepared as described in Example 53 and having a viscosity of 90,000 cps. at 70° C. and an equivalent weight of 154. The resulting polyol mixture had a viscosity of 5,200 cps. at 50° C. an average functionality of 5.40 and an hydroxyl number of 439.

EXAMPLE 57

A polyol mixture was prepared by intimately mixing (a) 10 parts by weight of di(1,2-propylene) glycol and (b) 90 parts by weight of a polyamine-propylene oxide polyol adduct prepared as described in Example 53 and having a viscosity of 90,000 cps. at 70° C. and an equivalent weight of 154. The resulting polyol mixture had a viscosity of 11,000 cps. at 50° C. an average functionality of 5.6 and an hydroxyl number of 410.

EXAMPLE 58

A polyol mixture was prepared by intimately mixing (a) 10 parts by weight of diethylene glycol and (b) 90 parts by weight of a polyamine-propylene oxide polyol adduct prepared as described in Example 53 and having a viscosity of 90,000 cps. at 70° C. and an equivalent weight of 154. The resulting polyol mixture had a viscosity of 15,000 cps. at 50° C., an average functionality of 5.6 and an hydroxyl number of 425.

EXAMPLE 59

A polyol mixture was prepared by intimately mixing (a) 17 parts by weight of a glycerol-propylene oxide polyol adduct (equiv. wt.=89) containing 1.01 equivalents of propylene oxide per 1.0 hydroxyl equivalents of glycerol and (b) 83 parts by weight of a polyamine-propylene oxide polyol adduct prepared as described in Example 53 and having a viscosity of 90,000 cps. at 70° C. and an equivalent weight of 154. The resulting polyol mixture and had a viscosity of 9,000 cps. at 50° C., an average functionality of 5.5 and an hydroxyl number of 410.

EXAMPLE 60

A polyol mixture was prepared by intimately mixing (a) 25 parts by weight of triethanolamine and (b) 75 parts by weight of a polyamine-propylene oxide polyol adduct prepared as described in Example 53 and having a viscosity of 90,000 cps. at 70° C. and an equivalent weight of 154. The resulting polyol mixture had a viscosity of 6,000 cps. at 50° C., an average functionality of 5.25 and an hydroxyl number of 555.

EXAMPLE 61

A polyol mixture was prepared by intimately mixing (a) 25 parts by weight of an ethylene oxide-trimethylolpropane adduct (equiv. wt.=89) containing 1.0 equivalents of ethylene oxide per 1.0 hydroxyl equivalents of trimethylolpropane and (b) 75 parts by weight of a polyamine-propylene oxide polyol adduct prepared as described in Example 53 and having a viscosity of 90,000 cps. at 70° C. and equivalent weight of 154. The resulting polyol mixture had a viscosity of 4,500 cps. at 50° C., an average functionality of 5.25 and an hydroxyl number of 430.

EXAMPLE 62

A polyol mixture was prepared by intimately mixing (a) 11.3 parts by weight of triethanolamine (b) 11.2 parts by weight of di(1,2-propylene) glycol and (c) 67.5 parts by weight of a polyamine-propylene oxide polyol adduct prepared as described in Example 53 and having a viscosity of 90,000 cps. at 70° C. and equivalent weight of 154. The resulting polyol mixture had an average functionality of 4.63 and an hydroxyl number of 465.

EXAMPLE 63

A polyol mixture was prepared by intimately mixing (a) 15 parts by weight of di(1,2-propylene)glycol and (b) 85 parts by weight of a polyamine-propylene oxide polyol adduct prepared as described in Example 53 and having a viscosity of 90,000 cps. at 70° C. and equivalent weight of 154. The resulting polyol mixture had a viscosity of 10,000 cps. at 50° C., an average functionality of 5.1 and an hydroxyl number of 435.

EXAMPLE 64

A polyol mixture was prepared by intimately mixing equal parts by weight of (a) an ethylene oxide-trimethylolpropane adduct (equiv. wt.=89) containing 1.0 equivalents of ethylene oxide per 1.0 hydroxy equivalents of trimethylolpropane and (b) a polyamine-propylene oxide polyol adduct prepared as described in Example 54 and having an equivalent weight of 106. The resulting polyol had a viscosity of 3,600 cps. at 50° C., an average functionality of 4.5 and an hydroxyl number of 580.

EXAMPLE 65

A polyol mixture was prepared by intimately mixing equal parts of (a) a propylene oxide-glycerol polyol adduct (equiv. wt.=89) containing 1.01 equivalents of propylene oxide per 1.0 hydroxyl equivalent of glycerol and (b) a polyamine-propylene oxide polyol adduct prepared as described in Example 54 and having an equivalent weight of 106. The resulting polyol had a viscosity of 4,000 cps. at 50° C., an average functionality of 4.5 and an hydroxyl number of 580.

EXAMPLE 66

A polyol mixture was prepared by intimately mixing (a) 15 parts by weight of diethylene glycol and (b) 85 parts by weight of a polyamine-propylene oxide polyol adduct prepared as described in Example 53 and having a viscosity of 90,000 cps. at 70° C. and equivalent weight of 154. The resulting polyol mixture had a viscosity of 11,000 at 50° C., an average functionally of 5.1 and an hydroxyl number of 435.

EXAMPLE 67

A polyol mixture was prepared by intimately mixing (a) 15 parts by weight of a propylene oxide-glycerol polyol adduct (equiv. wt.=89) containing 1.01 equivalents of propylene oxide per 1.0 hydroxyl equivalents of glycerol and (b) 85 parts by weight of a polyamine-propylene oxide polyol adduct prepared as described in Example 53 and having a viscosity of 90,000 cps. at 70° C., and equivalent weight of 154. The resulting polyol mixture had a viscosity of 18,000 cps. at 50° C., an average functionality of 5.25 and an hydroxyl number of 405.

EXAMPLE 68

A polyol mixture was prepared by intimately mixing (a) 75 parts by weight of the polyamine-propylene oxide polyol adduct prepared as described in Example 53 (having a viscosity of 90,000 cps. at 70° C. and an equivalent weight of 154) and (b) 25 parts by weight of a propylene oxide-glycerol polyol adduct (equivalent wt.=89) containing 1.01 equivalents of propylene oxide per 1.0 hydroxyl equivalents of glycerol. The resulting polyol mixture had a viscosity of 5,300 cps. at 50° C., an average functionality of 5.25 and a hydroxyl number of 430.

Similarly, using the procedure set forth in the above Examples 56 to 68, polyol mixtures are prepared using as major component any of the polyamine-alkylene oxide adducts described in Examples 1 to 55 and, as the minor component, one or more supplementary polyols having an equivalent weight from about 30 to about 200, a functionality from 2 to 6.

(IV) Production of novel polyurethane foams of the invention

As mentioned above, the novel aspect of the novel polyurethane foams of this invention resides in the particular polyol mixtures used to produce them. Any suitable method can be used for the interaction of polyisocyanates and the novel polyol mixture of this invention. These methods are generally known in the art as shown, for example, by Saunders et al., supra. Although any suitable polyisocyanates can be used, as mentioned above, mixtures of methylene-bridged polyphenyl polyisocyanates are specially preferred not only for reasons of economy (because such isocyanates are usually produced from the same type of methylene-bridged polyphenyl polyamine mixtures used to produce the polyamine-alkylene oxide polyol adduct components of the novel polyol mixtures of this invention) but also because the polyurethane foams produced from this particular combination of polyisocyanate mixture and polyol mixture have unexpectedly advantageous properties, particularly in the case of rigid foams, with regard to high strength and minimal volume change after being subjected to conditions of high temperature and/or high humidity. Many of the novel foams of this invention also have surprisingly low surface friability and are either non-burning or self-extinguishing at lower than normal phosphorus levels.

In each of the following examples the method of preparation of the polyurethane foams, and the ingredients used other than isocyanate and polyol, were substantially uniform throughout in order to make possible direct comparison of the properties of the various foams produced and thereby to illustrate the unexpected superiority of the novel polyurethanes of the invention. It is to be understood, however, that other methods of foam production including prepolymer systems, quasi-prepolymer systems, continuous methods, spraying techniques, and frothing techniques can be used.

The method of foam production in each of the following examples was as follows. All the components of the foam mix, other than polyisocyanate, were mixed using a mechanical blender, the trichloromonofluoromethane (Freon 11-B) blowing agent being added last. To the resulting mixture was added, as rapidly as possible, the isocyanate and the mixture so obtained was stirred with a high speed stirrer for approximately 30 seconds before being poured into an open mold (7" x 7" x 12"). The resulting foam was allowed to rise freely and was cured at room temperature (20 to 25° C.) for 7 days before being subjected to physical testing. All tests were carried out in accordance with the procedures set forth in "Physical Test Procedures for Rigid Urethane Foams," published by Market Development Section, Atlas Chemical Industries, Inc., Wilmington 99, Del., unless otherwise stated.

EXAMPLE 69

A series of rigid polyurethane foams was prepared using the procedure described above and employing the ingredients set forth in Table V below (all quantities in parts by weight). The polyols employed are identified by reference to the Example number of this specification which shows the preparation of the polyol mixture in question with the exception of "Polyol I" which was prepared as follows:

Polyol I was prepared by intimately mixing (a) 20 parts by weight of a glycerol-propylene oxide polyol adduct (equiv. wt.=140) containing 1.88 equivalents of propylene oxide for 1.0 hydroxyl equivalents of glycerol and (b) 80 parts by weight of a polyamine-propylene oxide polyol adduct prepared as described in Example 53 above and having a viscosity of 90,000 cps. at 70° C. and an equivalent weight of 154. Polyol I had a viscosity of 4000 cps. at 50° C., an average functionality of 5.4 and an hydroxyl number of 370.

TABLE V

| Materials | Foam | | | | | | |
|---|---|---|---|---|---|---|---|
| | A | B | C | D | E | F | G |
| Polyol I | 100 | | | | | | |
| Polyol of Ex. 56 | | 100 | | | | | |
| Polyol of Ex. 57 | | | 100 | | | | |
| Polyol of Ex. 58 | | | | 100 | | | |
| Polyol of Ex. 59 | | | | | 100 | | |
| Polyol of Ex. 60 | | | | | | 100 | |
| Polyol of Ex. 61 | | | | | | | 100 |
| DC-201 [1] | 2 | 2 | 2 | 2 | 2 | 2 | 2 |
| N,N,N',N'-tetramethyl 1,3-butanediamine | 2 | 0.8 | 1 | 1 | 1 | | 0.3 |
| Triethylamine | 1 | 0.8 | 1 | 1 | 1 | | 0.3 |
| Freon 11-B [2] | 34 | 32 | 34 | 35 | 33 | 40 | 32 |
| PAPI® [3] | 86 | 113 | 106 | 108 | 100 | 104 | 113 |
| Density, p.c.f. | 1.70 | 2.00 | 1.93 | 1.94 | 1.91 | 1.77 | 2.08 |
| //Compression, p.s.i. | 16.4 | 24.8 | 27.6 | 26.2 | 26.7 | 34.7 | 24.3 |
| S/D | 9.6 | 12.4 | 14.3 | 13.5 | 14.0 | 19.6 | 11.7 |
| Percent Δ Vol. at 158° F., 100% R.H. | | | | | | | |
| 7 days | 18.5 | 3.2 | 8.3 | 8.0 | 9.8 | 5.1 | 6.9 |
| Percent Δ Vol. at 200° F., Ambient R.H. | | | | | | | |
| 3 days | 10.9 | 1.7 | 3.5 | 2.1 | 3.6 | 2.8 | 1.4 |
| 7 days | 12.6 | 2.5 | 4.3 | 2.6 | 4.4 | 2.9 | 2.8 |

[1] A water-soluble silicone-glycol copolymer cell control agent and foam stabilizer.
[2] Stabilized trichlorofluoromethane.
[3] Polymethylene polyphenyl isocyanate of equivalent weight 133.

It will be seen from the above data that Foams B, C, D, E, F, and G, all of which were prepared from polyol mixtures of this invention were characterized by high compressive strength, and ratio of strength to density and by their remarkably low degree of volume change on humid aging. Foam A is inferior to any of the other foams but still possesses high compressive strength and good stability on humid aging.

EXAMPLE 70

A series of 3 rigid polyurethane foams was prepared using the procedure described above and employing the ingredients set forth in Table VI below (all quantities in parts by weight). The polyols employed are identified by reference to the example number of this specification which shows the preparation of the polyol mixture in question. The polyol used to prepare Foam H contained a supplementary polyol having secondary hydroxyl groups while those used to prepare Foams I and J contained supplementary polyols having exclusively primary hydroxyl groups. The difference in flame retardant properties of the Foams H and I, each of which contains substantially the same amount of phosphorus, dramatically illustrates the difference in this effect obtained by employing a supplementary polyol having exclusively primary hydroxy groups. Further the fire retardant properties of Foams I and J are almost identical even though the former has a phosphorus content only half that of the latter. All other properties of the three foams are strictly comparable and the foams are characterised by high strength and resistance to volume change on aging.

TABLE VI

| Materials | Foam | | |
|---|---|---|---|
| | H | I | J |
| Polyol of Ex. 56 | 90 | | |
| Polyol of Ex. 62 | | 90 | 90 |
| Fyrol 6 [1] | 10 | 10 | 22 |
| DC-201 | 2 | 2 | 2 |
| N,N,N',N'-tetramethyl-1,3-butanediamine | 0.5 | | |
| Triethylamine | 0.5 | | |
| Freon 11-B | 31 | 35 | 35 |
| PAPI® | 106 | 133 | 132 |
| Percent Phosphorus | 0.52 | 0.453 | 0.997 |
| NCO/OH | 1.05 | 1.10 | 1.10 |
| Density, p.c.f. | 1.84 | 1.99 | 1.90 |
| // Compression p.s.i. | 38.2 | 39.1 | 37.9 |
| Percent Δ Vol. at 158° F., 100% R.H. | | | |
| 24 hours | +1.5 | +0.78 | +1.0 |
| 7 days | +6.7 | +6.4 | +9.0 |
| 14 days | +10.6 | +11.4 | +20.1 |
| Percent Δ Vol. at 200° F., Dry Heat | | | |
| 3 days | +3.0 | +2.6 | +3.9 |
| 7 days | +4.3 | +4.1 | +5.4 |
| Flame Test (ASTM D 1692-59T) | | | |
| Total Inches Burned | 5 | 1 | ¾ |
| Classification | [2] | [3] | [4] |

[1] Diethyl N,N-di (2-hydroxyethyl)aminomethanephosphonate.
[2] Burning.
[3] Self-extinguishing.
[4] Non-burning.

EXAMPLE 71

A series of 3 rigid polyurethane foams was prepared using the procedure described above and employing the ingredients set forth in Table VII below (all quantities in parts by weight). The polyols employed are identified by reference to the example number of this specification which shows the preparation of the polyol mixture in question. The polyol used to prepare Foam K contained a supplementary polyol having exclusively primary hydroxyl groups whereas those used to prepare Foams L and M contained supplementary polyols having secondary hydroxyl groups. While all other properties of the foams are comparable it will be seen that the flame retardant properties of Foam K are strikingly superior to those of Foams L and M. The high volume change on humid aging shown by all the foams is a common characteristic of foams produced using any phosphorus polyol.

TABLE VII

| Materials | Foams | | |
|---|---|---|---|
| | K | L | M |
| Polyol of Ex. 66 | 66 | | |
| Polyol of Ex. 63 | | 66 | |
| Polyol of Ex. 67 | | | 67 |
| FR-P8 [1] | 34 | 34 | 33 |
| DC-201 | 2 | 2 | 2 |
| N,N,N',N'-tetramethyl-1,3-butanediamine | 1 | 1 | 1 |
| Triethylamine | 0.5 | 0.5 | 0.5 |
| Freon 11-B | 35 | 35 | 35 |
| PAPI R | 113 | 108 | 101 |
| Percent Phosphorus | 1.07 | 1.02 | 1.04 |
| NCO/OH | 1.10 | 1.10 | 1.10 |
| Density, p.c.f. | 1.83 | 1.87 | 1.95 |
| // Compression, p.s.i. | 15.2 | 18.8 | 30.6 |
| Percent Δ Vol. at 158° F. 100% R.H. | | | |
| 24 hours | +9.6 | +11.9 | +12.1 |
| 7 days | +17.6 | +20.3 | +16.7 |
| 14 days | +23.2 | +25.6 | +23.9 |
| Percent Δ Vol. at 200° F., Dry Heat | | | |
| 3 days | +3.5 | +4.5 | +3.9 |
| 7 days | +5.1 | +6.2 | +5.9 |
| Flame Test (ADTM D 1692-59T) | | | |
| Total Inches Burned | ½ | 1⅜ | 2⅜ |
| Classification | [2] | [3] | [3] |

[1] A propylene oxide-phosphoric acid adduct (Equivalent wt. equals 150).
[2] Non-burning.
[3] Self-extinguishing.

19

EXAMPLE 72

A series of 3 rigid polyurethane foams was prepared using the procedure described above and employing the ingredients set forth in Table VIII below (all quantities in parts by weight). Two of the polyols employed (for Foams O and P) are polyol mixtures falling within the present invention and are identified by reference to the Example number of this specification which shows the preparation of the polyol mixture in question. The polyol used to prepare Foam N was a mixture of commercially available polyol of the prior art. The data in Table VIII underline the superior strength and resistance to volume change on aging of the Foams O and P prepared in accordance with the invention as compared to Foam N prepared using a prior art polyether polyol mixture.

TABLE VIII

| Materials | Foams | | |
|---|---|---|---|
| | N | O | P |
| PG-560DM [1] (3 parts) plus PG-435DM [2] (1 part) | 80 | | |
| Polyol of Ex. 65 | | 80 | |
| Polyol of Ex. 64 | | | 80 |
| Fyrol 6 | 20 | 20 | 20 |
| SF-1109 [3] | 1.4 | 1.4 | 1.4 |
| Triethylamine | 2.0 | 2.0 | 1.6 |
| Water | 0.3 | 0.3 | 0.3 |
| Freon-11B | 35 | 37 | 37 |
| PAPI®-quasi [4] | 144 | 155 | 156 |
| Percent Phosphorus | 0.877 | 0.840 | 0.873 |
| NCO/OH | 1.10 | 1.10 | 1.10 |
| Density, p.c.f. | 1.82 | 1.72 | 1.74 |
| //Compression | 28.2 | 28.4 | 30.5 |
| S/D | 15.5 | 16.5 | 17.5 |

| Percent Δ Vol. at 158° F. 100% R.H. | | | |
|---|---|---|---|
| 24 hours | 5.9 | 3.5 | 3.7 |
| 3 days | 7.0 | 4.1 | 4.0 |
| 7 days | 7.9 | 4.4 | 4.4 |

| Percent Δ Vol. at 200° F. Ambient R.H. | | | |
|---|---|---|---|
| 3 days | 0.9 | 0.6 | 0.6 |
| 7 days | 2.1 | 1.6 | 1.5 |

| Flame Test (ASTM D 1692-59T) | | | |
|---|---|---|---|
| Total Inches Burned: | | | |
| Max | 1¼ | 1¼ | 1 |
| Min | 1⅛ | 1¹/₁₆ | ⅜ |
| Classification | S.E. | S.E. | S.E. |
| Percent Δ lineal change, 24 hrs. at 200° F., Ambient R.H.: | | | |
| Length | −0.81 | −0.65 | −0.72 |
| Width | +0.88 | +0.64 | +0.64 |
| Thickness | +0.86 | +0.64 | +0.60 |
| Percent Δ lineal change, 24 hrs. at −30° F.: | | | |
| Length | −0.05 | 0 | −0.05 |
| Width | −0.68 | −0.75 | −0.69 |
| Thickness | −0.62 | −0.31 | −0.38 |

[1] Polyoxypropylene polyether based on methylglucoside; equiv. wt.=100.
[2] Polyoxypropylene polyether based on methylglucoside; equiv. ft.=129.
[3] Block copolymer of dimethyl polysiloxane polyethylene oxide surfactant.
[4] Quasi propolymer prepared by reacting 98 parts by weight of PAPI® and 2 parts by weight of a propylene oxide-glycerol adduct of equivalent weight 89. (Isocyanate Equivalent=140.)

EXAMPLE 73

This example demonstrates the effect of molar proportion of alkylene oxide to amine equivalents of polyamine on the properties of the hydroxyalkylated polyamines prepared by condensation of said alkylene oxide and polyamine. The following polyols were prepared:

Using as starting material a polyamine mixture containing 50 percent by weight of methylendianiline, the remainder being triamines and polyamines of higher molecular weight (said mixture having been obtained by acid condensation of aniline and formaldehyde using the general procedure described previously) four polyols were prepared using the procedure of Example 53 and employing a proportion of 2.0, 3.5, 4.4, and 5.5 moles of propylene oxide per amine equivalent of starting material. In the case of the polyol with 2.0 mole proportions of propylene oxide per amine equivalent no potassium hydroxide catalyst was employed. In the experimental results recorded below the above four polyols are identified as C-110 [50% MDA: 2.0 P.O.], C-151 [50% MDA: 3.5 P.O.], C-180 [50%: 4.4 P.O.], and C-210 [50% MDA: 5.5 P.O.], respectively.

For purposes of comparison a polyamine containing 85 percent methylenedianiline, the remainder being triamines and polyamines of higher molecular weight was prepared using exactly the procedure described in Example 1 of French Patent of Addition No. 79,511, supra, and this polyamine was propoxylated using 5.5 moles of propylene oxide per amine equivalent, according to the procedure of Example 53, to give a polyol of equivalent weight 217 corresponding to that described in Example 14 of the aforesaid French Patent of Addition No. 79,511. The polyol so obtained is designated C-217 [85% MDA: 5.7 P.O.] in the experimental data recorded below.

A series of polyurethane foams was prepared from the above polyols using the components and proportions (all parts by weight) shown below in Table IX and employing the procedure described immediately before Example 69. In each case the supplementary polyol was that described in Example 55. The amount of polyisocyanate was adjusted in each case so that the overall NCO/OH ratio was 1.10:1.

TABLE IX

| Materials | Foams | | | | |
|---|---|---|---|---|---|
| | Q | R | S | T | U |
| C-110[50% MDA: 2.0 P.O.] | 50 | | | | |
| C-151[50% MDA: 3.5 P.O.] | | 50 | | | |
| C-180[50% MDA: 4.4 P.O.] | | | 50 | | |
| C-210[50% MDA: 5.5 P.O.] | | | | 50 | |
| C-217[85% MDA: 5.7 P.O.] | | | | | 50 |
| Supplementary polyol[Ex. 55] | 50 | 50 | 50 | 50 | 50 |
| L-5310 [1] | 2 | 2 | 2 | 2 | 2 |
| N,N,N',N'-tetramethyl-1,3-butanediamine | 1.5 | 1 | 1 | 1 | 1 |
| Triethylamine | 1.5 | 1 | 1 | 1 | 1 |
| Freon 11-B | 30 | 28 | 27 | 28 | 28 |
| PAPI® | 117 | 98 | 90 | 84 | 84 |
| Density, p.c.f. | 1.95 | 1.88 | 1.93 | 1.90 | 1.93 |
| Compressive Strength, p.s.i. (parallel to rise) | 43.0 | 35.7 | 30.0 | 29.6 | 28.0 |
| Strength to Density | 22.1 | 19.2 | 15.8 | 15.9 | 14.8 |

| Percent Volume change at 158° F., 100% Relative Humidity | | | | | |
|---|---|---|---|---|---|
| After 1 day | 1.2 | 2.1 | 10.2 | 12.9 | 18.3 |
| After 3 days | 1.7 | 3.1 | 19.1 | 22.8 | 33.9 |
| After 7 days | 1.9 | 4.2 | 31.4 | 37.5 | 52.5 |

| Percent Volume change at 200° F., Ambient Relative Humidity | | | | | |
|---|---|---|---|---|---|
| After 3 days | 1.1 | 1.6 | 17.4 | 40.8 | 61.5 |
| After 7 days | 1.7 | 2.5 | 37.2 | 60.3 | 92.7 |

[1] L-5310 = Organosilicone block copolymer surfactant.

It will be seen from the above results that the foams T and U prepared from the polyols C-210 and C-217 (in both of which the molar proportion of propylene oxide to amine equivalent was greater than 5.0) were markedly inferior in compressive strength and humid aging properties to the foams, Q, R, and S prepared from C-110, C-151, and C-180. The compressive strength and humid aging properties of foams Q and R are outstandingly good.

EXAMPLE 74

A polyol mixture was prepared by intimately mixing (a) 50 parts by weight of the polyamine-propylene oxide polyol adduct prepared as described in Example 54 and having an equivalent weight of 106 and (b) 40 parts of di(1,2-propylene) glycol. The resultant polyol mixture had a viscosity of about 30,000 cps. at 25° C., an average functionality of 4.1 and an hydroxyl number of 650.

We claim:
1. A polyol comprising a mixture of:
(a) an hydroxyalkylated polyamine which is the product of reacting at about 125° C., to about 250° C.:
(i) from 2 to 5 molecular equivalents of a member selected from the group consisting of ethylene oxide, propylene oxide, 1,2-butylene oxide, and mixtures thereof, and

(ii) one amine equivalent of a polyamine mixture, 100 parts of said polyamine mixture containing about 50 parts of methylenedianilines the remaining parts being triamines and polyamines of higher molecular weight said polyamine mixture having been formed by acid condensation of aniline and formaldehyde; and (b) a supplementary polyol having a functionality in the range of 2 to 6, inclusive, and an equivalent weight in the range of 30 to 200;

wherein the proportion of component (a) in said mixture is from 50 to 90 percent by weight.

2. A polyol mixture according to claim 1 wherein the overall hydroxyl number of said mixture is within the range of 280 to 650.

3. A polyol according to claim 1 wherein the alkylene oxide employed to prepare the component (a) is propylene oxide.

4. A polyol mixture according to claim 1 wherein the supplementary polyol is an adduct of propylene oxide and glycerol containing approximately 1 equivalent of propylene oxide for each hydroxyl equivalent of glycerol.

5. A polyol mixture according to claim 1 wherein the supplementary polyol is an adduct of ethylene oxide and trimethylolpropane containing approximately 1 equivalent of ethylene oxide for each hydroxyl equivalent of trimethylolpropane.

6. A polyol mixture according to claim 1 wherein the supplementary polyol is an adduct of aniline and propylene oxide.

7. A polyol comprising a mixture of:
(a) an hydroxypropylated polyol which is the product of reacting at about 125° C. to about 250° C. (i) from 2 to 5 molecular equivalents of propylene oxide and (ii) one amine equivalent of a polyamine mixture, 100 parts of said polyamine mixture containing about 50 parts of methylenedianilines the remaining parts being triamines and polyamines of higher molecular weight said polyamine mixture having been formed by acid condensation of aniline and formaldehyde; and (b) a supplementary polyol said supplementary polyol being an aliphatic triol having an equivalent weight in the range of 30 to 90;

wherein the proportion of component (a) in said mixture is from 50 to 90 percent by weight.

8. A polyol mixture according to claim 7 wherein the overall hydroxyl number of said mixture is within the range of 280 to 650.

9. A polyol mixture according to claim 7 wherein the amount of propylene oxide employed in preparing component (a) is 2 molar equivalents per amine equivalent of polyamine.

10. A polyol mixture according to claim 7 wherein the amount of propylene oxide employed in preparing component (a) is 3.5 molar equivalents per amine equivalent of polyamine.

11. A polyol mixture according to claim 7 wherein the supplementary polyol is an adduct of propylene oxide and glycerol containing approximately 1 equivalent of propylene oxide for each hydroxyl equivalent of glycerol.

12. A polyol mixture according to claim 7 wherein the supplementary polyol is an adduct of ethylene oxide and trimethylolpropane containing approximately 1 equivalent of ethylene oxide for each hydroxyl equivalent of trimethylolpropane.

13. A polyurethane foam which comprises the product of reacting an organic polyisocyanate and a polyol of claim 1 in the presence of a catalyst and a blowing agent.

14. A polyurethane foam which comprises the product of reacting an organic polyisocyanate and a polyol of claim 7 in the presence of a catalyst and a blowing agent.

15. A polyurethane foam which comprises the product of reacting an organic polyisocyanate and a polyol of claim 9 in the presence of a catalyst and a blowing agent.

16. A polyurethane foam which comprises the product of reacting an organic polyisocyanate and a polyol of claim 10 in the presence of a catalyst and a blowing agent.

17. A polyurethane foam which comprises the product of reacting an organic polyisocyanate and a polyol of claim 11 in the presence of a catalyst and a blowing agent.

18. A polyurethane foam which comprises the product of reacting an organic polyisocyanate and a polyol of claim 12 in the presence of a catalyst and a blowing agent.

References Cited

UNITED STATES PATENTS

| 2,683,730 | 7/1954 | Seegar et al. | 260—453 |
| 2,950,263 | 8/1960 | Abbotson et al. | 260—2.5 |
| 3,159,591 | 12/1964 | Canham | 260—2.5 |
| 3,175,007 | 3/1965 | Berhenke | 260—571 |
| 3,186,969 | 6/1965 | Cox et al. | 260—51.5 |
| 3,245,924 | 4/1966 | Cox et al. | 260—2.5 |

FOREIGN PATENTS

| 910,333 | 11/1962 | Great Britain. |
| 967,359 | 8/1964 | Great Britain. |
| 79,511 | 11/1962 | France. |
| 1,233,862 | 11/1962 | France. |

DONALD E. CZAJA, *Primary Examiner.*

MICHAEL B. FEIN, *Assistant Examiner.*

U.S. Cl. X.R.

260—75, 77.5, 570